US008460110B2

(12) United States Patent
Costin et al.

(10) Patent No.: US 8,460,110 B2
(45) Date of Patent: Jun. 11, 2013

(54) FANTASY FOOTBALL SYSTEM (76) Inventors: Darryl J Costin, Westlake, OH (US);
Darryl Costin, Jr., Westlake, OH (US)

(*) Notice: Subject to any disclaimer, the term of this patent is extended or adjusted under 35 U.S.C. 154(b) by 824 days.

(21) Appl. No.: 12/014,010

(22) Filed: Jan. 14, 2008

(65) Prior Publication Data
US 2009/0181738 A1  Jul. 16, 2009

(51) Int. Cl.
*G06F 17/00* (2006.01)
(52) U.S. Cl.
USPC ............ 463/42; 463/4; 463/6; 463/9; 463/40; 463/43; 700/90; 700/91; 700/92; 700/93; 705/35
(58) Field of Classification Search
USPC ....... 463/4, 6, 7, 9, 39–43; 700/90–93; 705/9, 705/35
See application file for complete search history.

(56) References Cited

U.S. PATENT DOCUMENTS

2002/0115488 A1* 8/2002 Berry et al. ............... 463/42
2004/0266530 A1* 12/2004 Bishop ....................... 463/42

OTHER PUBLICATIONS

Bowl Championship Series Rules, Oct. 8, 2010, Bowl Championship Series Faqs pp. 1-4 http://www.tellshowbcs.com/FAQ.html.*
Bowl Championship Series (BCS), Oct. 8, 2010, BCS selection procedures pp. 1-10, http://www.bcsfootball.org/news/story?id=4819597.*
EA Sports, NCAA 08 Football, Released Jul. 2007, pp. 1-6.*

* cited by examiner

*Primary Examiner* — Sunit Pandya
(74) *Attorney, Agent, or Firm* — Law Office of Scott C. Harris, Inc.

(57) ABSTRACT

A fantasy football game which is carried out as a tournament play over the Internet. The fantasy football game can be played between different computers. The hosting computer maintains information indicative of the teams performance as well as their strength of schedule. Winners who play in the playoffs are selected based on both information such as the win loss record, but also the strength of schedule. In addition to the win loss record, total points scored by teams, total numbers of losses and other information may be maintained in order to find more information about the win loss record.

17 Claims, 2 Drawing Sheets

The New Way Playoff Contenders Are Selected in Fantasy Football

Figure 1. Conventional Way Playoff Contenders Are Selected in Fantasy Football

Figure 2. The New Way Playoff Contenders Are Selected in Fantasy Football

FANTASY FOOTBALL SYSTEM

BACKGROUND

Fantasy football is played by millions of fans each year and is growing in popularity at accelerating rates. Huge corporations, such as Yahoo, Walt Disney's ESPN, and CBS's Sportsline have set up elaborate websites to host the different types of leagues and are heavily competing to gain market share. In many cases, people can set up a league and play for free on these websites. Some sites offer premium fantasy packages for a fee that offer more services such as news, draft strategies and scouting reports about individual players as well as real-time stat updates.

However, several media companies are recognizing that it is more lucrative to not charge fantasy players since free games draw more traffic, and therefore, bring in more advertising revenue. Visa and General Motors' GMC unit have returned as main marketing sponsors for Yahoo's fantasy football. In order to compete, ESPN is stepping up its efforts to increase its fantasy presence. It launched a fantasy football TV show that airs on ESPN2. ESPN also offers fantasy advice through its magazine, radio shows and podcasts.

To get started in Fantasy Football, a group of participants, normally between 8 to 12 people, may set up a league from one of the numerous websites where they will then pick individual players from professional teams to represent their team. These players are drawn from all 32 teams in the NFL. Each team select a roster of professional players from several different positions and from several different teams. One team may have, for example, the quarterback from the New England Patriots, a running back from the New York Giants, and a wide receiver from the Cleveland Browns. A team selects a full compliment of players (usually between 15-25 players) during a draft or auction process. Once this has been completed, each participant, referred to as an owner, has acquired their Fantasy Football team roster.

Each week, every player fills out their rosters depending upon the rules of the league. Typically, a player will start one quarterback, two running backs, three wide receivers or tight ends, one kicker, and one defense. This may change depending upon the type of league and rules that were established. The most common kind of league will have head to head match-ups between the players each week. For example, the starting roster of one team will face off against the starting roster of another team. The team with the most points for that week wins.

The next week, those two teams will play different teams. This will continue until the season is over. Usually, towards the end of the season, the teams with the best Win-Loss Record make their league playoffs. The winner of the playoffs is considered the champion. The points come from the NFL's players' personal statistics for that week. The statistics are usually based upon your players scoring touchdowns, yards rushed, yards passed, yards received, field goals, and defensive turnovers and sacks. Each statistic is given a particular point value, which are added up to determine what number of fantasy points each NFL player receives. Leagues will sometimes have a slightly different point allocation system based upon the above criteria; however, the rankings are based on Win-Loss Records.

SUMMARY

However, as exciting and popular fantasy football has become, the inventors recognized a significant fault that often turns into a major injustice. The inventors noticed that the best and most skillful teams do not always make it to the playoffs. There is indeed a factor of luck in regards to the current Fantasy Football ranking system.

The authors have conceived of an entirely new and improved method to rank each Fantasy Football team, making the selection of playoff contenders a much more accurate representation of overall performance and skill.

In an embodiment, the teams most deserving of a playoff game are selected.

Instead of determining the ranking based upon one's Win-Loss Record, the inventors' new method for ranking teams, and thus selecting playoff contenders, takes into account other critical factors that reflect the quality and skill of each team throughout the season.

An important feature of the ranking used according to an embodiment is the individual team's Strength of Schedule. This new ranking system accounts for the Strength of Schedule. A team that has very easy schedules do not automatically make it into the playoffs because of their best, yet easy, Win-Loss Records.

An embodiment of the new ranking system includes a component for the Win-Loss Record, a component for the Total Points, and a component for the Strength of Schedule. Each component can be assigned a weight relative to the perceived importance of each component and then a formula can be used to determine the proper and fair ranking, and thus, the selection of the playoff contenders. This system helps insure that the best teams deserve to go to the playoffs, not the most lucky ones. The ranking system could include other factors such as margin of victory.

DETAILED DESCRIPTION

The inventors noticed that a typical ranking system for a fantasy football system ranks the teams by the highest winning percentage. If two teams have the same record, the tiebreaker is decided by the team with the most overall points.

The inventors noticed that the difficulty of the season is set from the moment you sign into a league in conventional systems. The website chooses your match-up for each week throughout the entire season. This leads to a luck component. The inventors found that the most deserving teams are not selected for the playoffs.

For example, one team could have a record of 9 wins and 5 losses, yet most of their wins could be from scoring a small amount of points each week, such as 70, while their weaker opponent scored even less. Meanwhile, another team could have a record of 8 wins and 6 losses, but scored an average of 110 points per week. The skill of one's team can be measured by the amount of points his/her team has scored and the capability of the opponents, not necessarily by their record. A team could have the best Win-Loss Record in the entire league because of match-ups with the weakest opponents.

The luck of the game comes down to who you play for that week, a team that scores high or a team that scores low.

In order to devise an accurate ranking system and thus select deserving teams for the playoffs, an embodiment sets additional criteria besides one's Win-Loss Record, and most importantly account for an individual team's Strength of Schedule.

Figure 1:
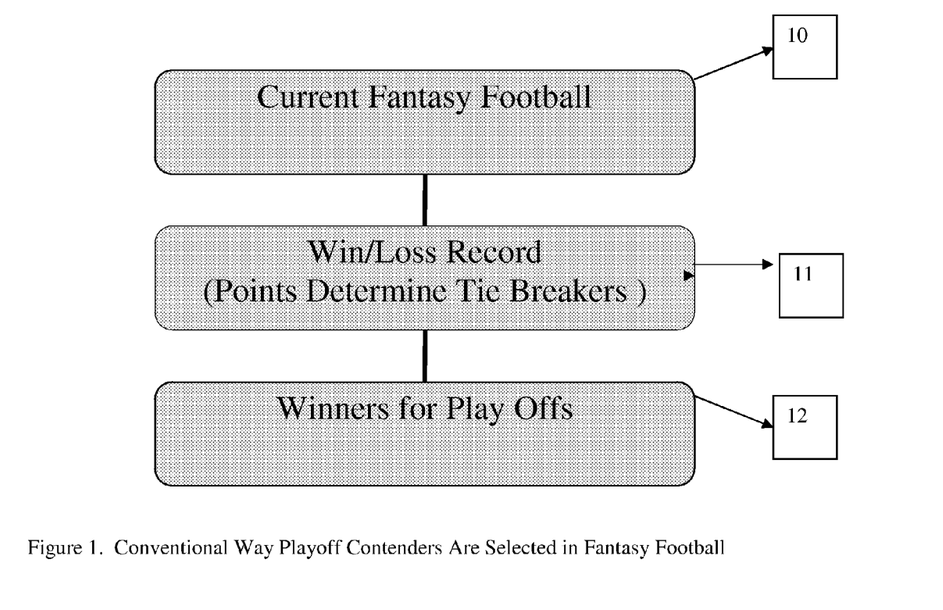
FIG. 1 shows a flowchart of a conventional system.

FIG. 1 shows the conventional method playoff contenders are selected from Fantasy Football web sites such as Yahoo!, Sportingnews.com, Fantasy Sports, and CDM Fantasy Sports. The web site is depicted as 10. The various teams' Win-Loss Record is then determined at 11. In the conventional Fantasy Football scoring system, the Total Points awarded each team is only used as tie breakers for teams with equal Win-Loss Records at 11. Finally, the playoff contenders are selected based on the best Win-Loss Record at 12.

Figure 2:
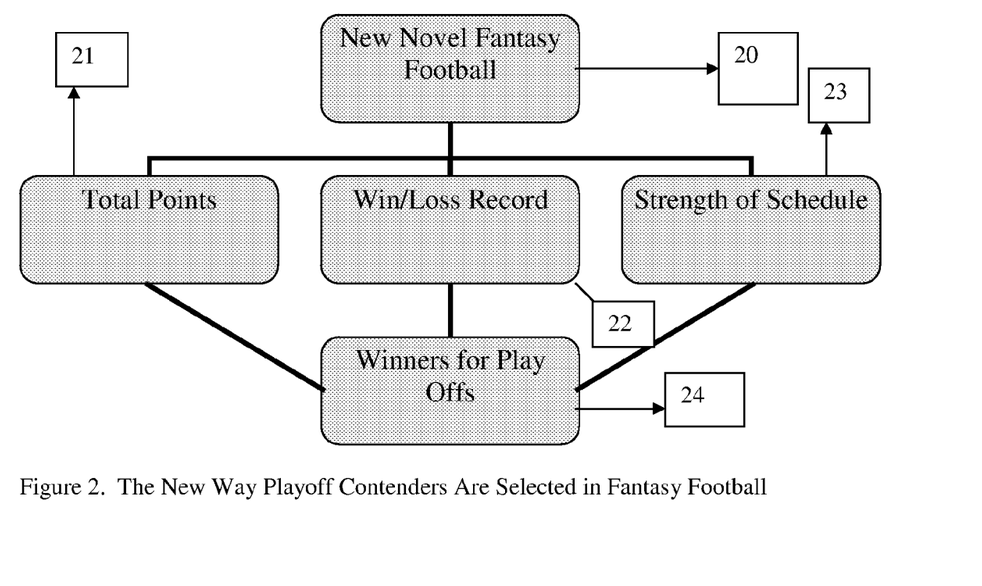
FIG. 2 shows a flowchart of operation of a system of an embodiment

FIG. 2 shows an embodiment of the inventors' improved method at 20. First the Total Points of each team are computed at 21. Then the teams' Win-Loss record is determined at 22. The teams' Strength of Schedule factor is then calculated at 23. A value is derived from some weighted combination of these three factors which then determines the playoff contenders at 24.

Table 1 provides actual numbers and statistics from the teams for a particular Fantasy Football league, Guillotine Cup, set up by twelve men on the Yahoo! Sports web site in 2007. It is based upon the specific rules and guidelines established by all the teams for this league. Each league can set up its own rules and guidelines. For example, one league may desire to reward 7 points to a quarterback for a touchdown pass, while another league may reward 4 points for the same. However it should be emphasized that the Total Points only serve to break ties amongst teams with equivalent Win-Loss Records in conventional Fantasy Football. Table 1 shows the ranking of each team in the Guillotine Cup league conventional Fantasy Football system for 2007, the Win-Loss Record for each team and the Total Points awarded each team.

TABLE 1

Conventional Fantasy Football Ranking for Guillotine Cup League in Yahoo! Sports Fantasy Football in 2007

| Rank | Team | Win-Loss Record | Total Points |
|---|---|---|---|
| 1 | the Dude Abides | 9-5 | 1501 |
| 2 | Whose Yer Daddy | 9-5 | 1397 |
| 3 | Csonka's Hammer | 9-5 | 1243 |
| 4 | Cobra Kai | 8-6 | 1307 |
| 5 | Riggo's Hogs | 8-6 | 1274 |
| 6 | CB's rebellion 2 | 8-6 | 1094 |
| 7 | Da Browns | 7-7 | 1432 |
| 8 | Bowers Boyz 2007 | 6-8 | 1253 |
| 9 | North Coast Gamblers | 5-9 | 1181 |
| 10 | Bucknuts | 5-9 | 1163 |
| 11 | London Express | 5-9 | 1123 |
| 12 | Turd Fergueson | 5-9 | 1083 |

A few critical observations are noted according to this data derived from the current Fantasy Football scoring and ranking system, common to Fantasy Football leagues on other web sites. Csonka's Hammer finished with a 9-5 Win-Loss Record yet only scored 1243 Total Points throughout the entire season. Da Browns finished with a 7-7 Win-Loss Record but scored substantially more Total Points, namely 1432. So even though Da Browns had the second highest Total Points in the league, they were not amongst the top four in ranking and thus would not be a playoff contender. Importantly, there is no mention, let alone account, for the quality of opponents, or individual team's Strength of Schedule. This abnormality is caused by the current ranking system in Fantasy Football which is based almost exclusively on the Win-Loss Record. Since Da Browns did not have a Win-Loss Record in the top four teams, they would not be eligible for the playoffs. Yet they scored the second highest Total Points in the entire league! CB's rebellion 2 had a superior Win-Loss Record than Da Browns (8-6 vs. 7-7) but only scored 1094 Total Points, which is second lowest in the league. This example clearly reveals that overall Win-Loss Record does not necessarily reflect the best teams, which is typically the case. The major fault of the existing Fantasy Football ranking system is quite obvious in that the top four teams going to the playoffs are not necessarily the best teams in the league. Using a teams' Win-loss Record as the primary function for the leagues ranking is heavily flawed and simply cannot be a true representation of the quality or skill of each team.

The individual owner's goal in Fantasy Football is to achieve sufficient victories to get to the playoffs and then win the playoffs to become the champion. This invention discloses the importance of including the individual team's Strength of Schedule in the formula to determine the playoff contenders and thus more accurately reflect the best teams to make it to the playoffs.

There are a number of different ways to calculate the team's Strength of Schedule, several other components which could be included in the formula in addition to the Strength of Schedule, and different weights could be assigned to Strength of Schedule and the other components in the overall formula. However, it is critical to include some meaningful account of the Strength of Schedule in any fair and accurate determination of the teams eligible for the playoffs. The embodiments below illustrate two simple ranking systems which result in a significant improvement in the rankings for the Fantasy Football League, Guillotine Cup on the Yahoo site in 2007. Both assign a meaningful weight to an individual team's Strength of Schedule.

Embodiment 1

Each of these embodiments may be carried out on a server computer that is connected to the internet, and can be interfaced by a client computer. The server computer may be many different computers operating as one, as in a server farm or the like. It may host a web page, for example.

Tables 2a-2d illustrate just one example of a new formula which accounts for Strength of Schedule to determine playoff contenders in the Guillotine Cup Fantasy Football League. This example simply uses a formula consisting of a weighted average of three components for a teams' Total Points, Win-Loss Record, and Strength of Schedule, where the lower the value, the better the team.

The first table, 2a shows the ranking of the teams in the Guillotine Cup league for the first component, Total Points. Table 2a shows a quite a different rank then the conventional Fantasy Football system if the rank was based on Total Points only. The Total Points component is the total year to date points of every team in the league. A rank is assigned to each team based on the Total Points. For this example, the team with the most Total Points is ranked 1 and the team with the fewest Total Points is ranked 12. Each team's rank is then divided by 12 to derive the Total Points rating. That rating is then multiplied by the weighted value of 0.35 selected for this example. This example then assumes that the Total Points component should represent 35% of the total value for the team rankings.

Total Points

TABLE 2a

Total Points Component of Improved Fantasy Football Ranking System

| Owners | Points | Points Rating | Weighted Value | Rank |
|---|---|---|---|---|
| the Dude Abides | 1501 | 0.083 | 0.029 | 1 |
| Csonka's Hammer | 1243 | 0.583 | 0.204 | 7 |

TABLE 2a-continued

Total Points Component of Improved Fantasy Football Ranking System

| Owners | Points | Points Rating | Weighted Value | Rank |
|---|---|---|---|---|
| Whose Yer Daddy | 1397 | 0.250 | 0.088 | 3 |
| Cobra Kai | 1307 | 0.333 | 0.117 | 4 |
| Riggo's Hogs | 1274 | 0.417 | 0.146 | 5 |
| CB's rebellion 2 | 1094 | 0.917 | 0.321 | 11 |
| Da Browns | 1432 | 0.167 | 0.058 | 2 |
| Bowers Boyz 2007 | 1253 | 0.500 | 0.175 | 6 |
| North Coast Gamblers | 1181 | 0.667 | 0.233 | 8 |
| Turd Fergueson | 1083 | 1.000 | 0.350 | 12 |
| London Express | 1123 | 0.833 | 0.292 | 10 |
| Bucknuts | 1163 | 0.750 | 0.263 | 9 |

To further improve the accuracy of this component, Total Points rating, an embodiment accounts for the magnitude of the difference between the points of one team and the points of the other team. For example, as it now stands, the top ranking team, the Dude Abides has 69 points more than the next ranked team, Da Browns. Yet Riggo's Hogs are ranked one level higher than Bowers Boyz 2007 but only have 21 more points. Example 2 considers this factor.

A second component of this example of an improved Fantasy Football ranking system is the Win-Loss Record and penalizes a team for every loss over the total number of losses of the team with the best record. For example, the team, or teams, with the best Win-Loss Record will always have a 0 (no loss penalty). If the loss penalty is assigned say a value of 0.2, and the team with the best record is 8-1, a team with a 6-3 Win-Loss Record would get a loss penalty of 0.4. Similarly, a team with a 5-4 record would earn a 0.6 penalty, and so on. That penalty is then multiplied by the weighted value of 0.42. This particular example then assumes that the Win-Loss Record component should represent 42% of the total value for the team rankings. Table 2b shows that based on Win-Loss Record only, three teams would be tied for first, 3 teams tied for second, and 4 teams tied for fifth. So for the conventional Fantasy Football ranking system, the first three teams would make the playoffs and the team with the most Total Points would determine the remaining playoff contender amongst the three second place teams.

Win-Loss Record

TABLE 2b

Win-Loss Component of Improved Fantasy Football Ranking System

| Owners | LOSS Penalty | Weighted Value | Rank |
|---|---|---|---|
| the Dude Abides | 0 | 0 | 1 Tie |
| Csonka's Hammer | 0 | 0 | 1 Tie |
| Whose Yer Daddy | 0 | 0 | 1 Tie |
| Cobra Kai | 0.2 | 0.084 | 2 Tie |
| Riggo's Hogs | 0.2 | 0.084 | 2 Tie |
| CB's rebellion 2 | 0.2 | 0.084 | 2 Tie |
| Da Browns | 0.4 | 0.168 | 3 |
| Bowers Boyz 2007 | 0.6 | 0.252 | 4 |
| North Coast Gamblers | 0.8 | 0.336 | 5 Tie |
| Turd Fergueson | 0.8 | 0.336 | 5 Tie |
| London Express | 0.8 | 0.336 | 5 Tie |
| Bucknuts | 0.8 | 0.336 | 5 Tie |

A third component of this example of an improved Fantasy Football ranking system is Strength of Schedule and rewards teams who are matched up against high scoring opponents on a week to week basis. To compute the Strength of Schedule in this particular example, the values of the sub-parts are determined as shown in Table 2c. For the first sub-part, add the opponent's score from week to week and divide by the total number of opponents, which in this case is 12. That average is then multiplied by the weighted value, which in this case is 0.666, to obtain the first sub-part. For the second sub-part, each team receives a point value based on how many points their opponent scored for the week. Each team receives a new point value each week depending on how many points their opponent scored compared to all the other teams in the league. For example, in a 12 team league, the team whose opponent had the highest score for the week gets a value of 0.12. The team whose opponent had the second highest score for the week gets a value of 0.11. These values are awarded to each team down to a 0.01 value. The point value is then added from week to week to obtain a cumulative value, which is then multiplied by the weighted value, in this case is 0.333, to obtain the second sub-part. The results of both sub-parts are then added together in this example to determine the Strength of Schedule component, shown in Table 2c as Total S.O.S.

Although it seems like a complicated means to compute Strength of Schedule, it is but one of several methods which could be chosen to determine an individual team's Strength of Schedule. This is merely one example of a method which attempts to differentiate a team's performance by the quality of the opponents they face each week. Naturally some teams will be very strong and score many points each week; whereas, some teams will be very weak and score only a few points each week. Any Strength of Schedule method to account for these differences is what is important in this invention.

S.O.S. Breakdown

TABLE 2c

Strength of Schedule Sub-parts Component of Improved Fantasy Football Ranking System

| | Average Points Term | First Sub-Part | Cumulative Value Term | Second Sub-Part | Total S.O.S. |
|---|---|---|---|---|---|
| the Dude Abides | 0.932 | 0.621 | 1.04 | 0.346 | 0.967 |
| Csonka's Hammer | 0.838 | 0.558 | 0.86 | 0.286 | 0.844 |
| Whose Yer Daddy | 0.878 | 0.585 | 0.92 | 0.306 | 0.891 |
| Cobra Kai | 0.863 | 0.575 | 0.91 | 0.303 | 0.878 |
| Riggo's Hogs | 0.982 | 0.654 | 1.06 | 0.353 | 1.007 |
| CB's rebellion 2 | 0.796 | 0.530 | 0.65 | 0.216 | 0.747 |
| Da Browns | 0.934 | 0.622 | 1.08 | 0.360 | 0.982 |
| Bowers Boyz 2007 | 0.881 | 0.587 | 0.9 | 0.300 | 0.886 |
| North Coast Gamblers | 0.921 | 0.613 | 0.97 | 0.323 | 0.936 |
| Turd Fergueson | 0.897 | 0.597 | 0.98 | 0.326 | 0.924 |
| London Express | 0.957 | 0.637 | 1.07 | 0.356 | 0.994 |
| Bucknuts | 0.862 | 0.574 | 0.9 | 0.300 | 0.874 |

Each team is then ranked from 1 to 12 from the highest Strength of Schedule to the lowest. Each team's rank is then divided by 12, giving them a Strength of Schedule rating. That rating is then multiplied by the weighted value of 0.23 as shown in Table 2d. This example then assumes that the Strength of Schedule component should represent 23% of the total value for the team rankings.

S.O.S.

TABLE 2d

Strength of Schedule Component of Improved Fantasy Football Ranking System

| Owners | S.O.S | S.O.S. Rating | Weighted Value | Rank |
|---|---|---|---|---|
| the Dude Abides | 0.967 | 0.333 | 0.077 | 4 |
| Csonka's Hammer | 0.844 | 0.917 | 0.211 | 11 |
| Whose Yer Daddy | 0.891 | 0.583 | 0.134 | 7 |
| Cobra Kai | 0.878 | 0.750 | 0.173 | 9 |
| Riggo's Hogs | 1.007 | 0.083 | 0.019 | 1 |
| CB's rebellion 2 | 0.747 | 1.000 | 0.230 | 12 |
| Da Browns | 0.982 | 0.250 | 0.058 | 3 |
| Bowers Boyz 2007 | 0.886 | 0.667 | 0.153 | 8 |
| North Coast Gamblers | 0.936 | 0.417 | 0.096 | 5 |
| Turd Fergueson | 0.924 | 0.500 | 0.115 | 6 |
| London Express | 0.994 | 0.167 | 0.038 | 2 |
| Bucknuts | 0.874 | 0.833 | 0.192 | 10 |

It is most interesting to observe that the team with the toughest Strength of Schedule, Riggo's Hogs, was ranked fifth in the conventional Fantasy Football scoring system. Further, the second ranked team with the toughest Strength of Schedule, London Express, was ranked 11$^{th}$ in the conventional Fantasy Football scoring system! And the team ranked #1 in the conventional Fantasy Football scoring system for Guillotine Cup league, the Dude Abides, only ranked fourth in the new Strength of Schedule rating. This alone, demonstrates the deficiency in the current Fantasy Football ranking system by not accounting for an individual team's Strength of Schedule and verifies the inventor's new concept to account for the Strength of Schedule in the formula to determine the playoff contenders.

Other techniques may be used to attempt to determine and quantify a team's Strength of Schedule, but there are many methods to at least account for the Strength of Schedule. For example, the winning percentage of a team's opponents could be computed as well as the team's opponent's opponents. Also, as the weeks add up, the Strength of Schedule (S.O.S.) weighted value could increase. For example, at week one, the weighted value for S.O.S. may be only 0.03; whereas, after week 7-14, this value becomes 0.23. Then, a meaningful Strength of Schedule factor could be computed based on these percentages.

So taking in consideration the three components cited above in Example 1, all the data was compiled by adding each component for each team. Table 3 below reveals the final results with the team with the lowest total score ranked #1 and the team with the highest total score is ranked #12.

TABLE 3

New Fantasy Football Ranking System Results

| Rank | Team | Total Score |
|---|---|---|
| 1 | the Dude Abides | 0.106 |
| 2 | Whose Yer Daddy | 0.222 |
| 3 | Riggo's Hogs | 0.249 |
| 4 | Da Browns | 0.284 |
| 5 | Cobra Kai | 0.373 |
| 6 | Csonka's Hammer | 0.415 |
| 7 | Bowers Boyz 2007 | 0.580 |
| 8 | CB's rebellion 2 | 0.635 |

TABLE 3-continued

New Fantasy Football Ranking System Results

| Rank | Team | Total Score |
|---|---|---|
| 9 | North Coast Gamblers | 0.665 |
| 10 | London Express | 0.666 |
| 11 | Bucknuts | 0.790 |
| 12 | Turd Fergueson | 0.801 |

This new ranking system takes into account an individual team's Strength of Schedule as well as other factors and is a more accurate representation of each teams' skill set compared to the rest of the league. Table 4 below compares the rankings of the conventional Fantasy Football system and the new and improved ranking system disclosed in this invention. A few key observations from this new method show that Csonka's Hammer went from third place in Yahoo's ranking system to sixth place in the new ranking system, and thus would not be eligible for the playoffs in the new ranking method. Even though Csonka's Hammer was tied for first place in Win-Loss Record, they were seventh in Total Points and eleventh in Strength of Schedule. Strength of Schedule is critical in determining if a team faces a tough opponent week to week or a weak opponent who scores few points throughout the season. Da Browns moved up to fourth place in the new rankings as opposed to seventh place in Yahoo and would thus make the playoffs in the new ranking system, but not in the traditional ranking system used by Yahoo and others. Importantly, this team was third best in Strength of Schedule and second best in Total Points.

TABLE 4

Conventional Fantasy Football Ranking vs. New Ranking Method for Guillotine Cup League in Yahoo! Sports Fantasy Football

| Team | Fantasy Football Rank | New Rank |
|---|---|---|
| the Dude Abides | 1 | 1 |
| Whose Yer Daddy | 2 | 2 |
| Riggo's Hogs | 5 | 3 |
| Da Browns | 7 | 4 |
| Cobra Kai | 4 | 5 |
| Csonka's Hammer | 3 | 6 |
| Bowers Boyz 2007 | 8 | 7 |
| CB's rebellion 2 | 6 | 8 |
| North Coast Gamblers | 9 | 9 |
| London Express | 11 | 10 |
| Bucknuts | 10 | 11 |
| Turd Fergueson | 12 | 12 |

So in the conventional Fantasy Football ranking system, the Dude Abides, Whose Yer Daddy, Csonka's Hammer, and Cobra Kai go to the playoffs. In the new novel Fantasy Football ranking system, the Dude Abides, Whose Yer Daddy, Riggo's Hogs and Da Browns go the playoffs. It is critical to note that with the new system disclosed in this invention, one of two teams could win the championship that would not even be eligible under the standard fantasy football rating system.

Example 2

Tables 5a-5d below illustrate another example of a formula which accounts for Strength of Schedule to determine playoff contenders in the Guillotine Cup Fantasy Football League. This example simply uses a formula consisting of a weighted average of three components for a teams' Total Points, Win-Loss Record, and Strength of Schedule, where the higher the value, the better the team. It also takes into account the actual differences from one team to the next for the Total Points and Strength of Schedule components.

The first table, 5a shows the ranking of the teams in the Guillotine Cup league for the first component in the second example of an improved Fantasy Football ranking system, Total Points. Table 5a shows a quite a different rank then the conventional Fantasy Football system if the rank was based on Total Points only. The Total Points component is the total year to date points of every team in the league. A rank is assigned to each team based on the Total Points. In this example, the difference in points amongst the teams is computed by subtracting a team's Total Points from the team with the largest number of Total Points—in this case, the Dude Abides. The leader is then assigned a value of 1 and every other team a number less than one depending upon the difference in Total Points from their team and the leader. The points rating is then multiplied by the weighted value of 0.333, chosen in this case, to obtain the ranking. The new ranking based only on the difference in Total Points is shown in Table 5a and again produces substantially different results than the conventional ranking system in Fantasy Football. For example, Csonka's Hammer which ranked third in the conventional Fantasy Football scoring system, was ranked $7^{th}$ for this component. Conversely, Da Browns which was ranked $7^{th}$ in the conventional Fantasy Football scoring system was ranked $2^{nd}$ for this component.

Total Points

TABLE 5a

Total Points Component of Another Example of an Improved Fantasy Football Ranking System

| Owners | Points | Points Difference | Points Rating | Weighted Value | Rank |
|---|---|---|---|---|---|
| the Dude Abides | 1501 | 0 | 1 | 0.333 | 1 |
| Csonka's Hammer | 1243 | 258 | 0.742 | 0.247 | 7 |
| Whose Yer Daddy | 1397 | 104 | 0.896 | 0.298 | 3 |
| Cobra Kai | 1307 | 194 | 0.806 | 0.268 | 4 |
| Riggo's Hogs | 1274 | 227 | 0.773 | 0.257 | 5 |
| CB's rebellion 2 | 1094 | 407 | 0.593 | 0.197 | 11 |
| Da Browns | 1432 | 69 | 0.931 | 0.310 | 2 |
| Bowers Boyz 2007 | 1253 | 248 | 0.752 | 0.250 | 6 |
| North Coast Gamblers | 1181 | 320 | 0.68 | 0.226 | 8 |
| Turd Fergueson | 1083 | 418 | 0.582 | 0.194 | 12 |
| London Express | 1123 | 378 | 0.622 | 0.207 | 10 |
| Bucknuts | 1163 | 338 | 0.662 | 0.220 | 9 |

The second component in the second example of an improved Fantasy Football ranking system is the Win-Loss Record and penalizes a team for every loss over the total number of losses of the team with the best record. For example, the team, or teams, with the best record will always have a value of 1 (no loss penalty). In this example, the loss penalty was given a value of 0.1, as opposed to a 0.2 value in Table 2b. The loss penalty is then multiplied by the weighted value of 0.333, chosen in this example, to derive the ranking. Table 5b below shows that based on Win-Loss Record only, three teams would be tied for first, 3 teams tied for second, and 4 teams tied for fifth. So for the conventional Fantasy Football ranking system, the first three teams would make the playoffs and the Total Points would have to be used to determine the remaining playoff contender amongst the three second place teams.

Win-Loss Record

TABLE 5b

Win-Loss Component of Another Example of an Improved Fantasy Football Ranking System

| Owners | LOSS Penalty | Weighted Value | Rank |
|---|---|---|---|
| the Dude Abides | 1 | 0.333 | 1 Tie |
| Csonka's Hammer | 1 | 0.333 | 1 Tie |
| Whose Yer Daddy | 1 | 0.333 | 1 Tie |
| Cobra Kai | 0.9 | 0.300 | 2 Tie |
| Riggo's Hogs | 0.9 | 0.300 | 2 Tie |
| CB's rebellion 2 | 0.9 | 0.300 | 2 Tie |
| Da Browns | 0.8 | 0.266 | 3 |
| Bowers Boyz 2007 | 0.7 | 0.233 | 4 |
| North Coast Gamblers | 0.6 | 0.200 | 5 tie |
| Turd Fergueson | 0.6 | 0.200 | 5 tie |
| London Express | 0.6 | 0.200 | 5 tie |
| Bucknuts | 0.6 | 0.200 | 5 tie |

The third component in the second example of an improved Fantasy Football ranking system, Strength of Schedule, rewards teams who are matched up against high scoring opponents on a week to week basis. To find the overall strength of schedule in this example, the value of the sub-parts are determined as shown in Table 5c.

For the first sub-part, add the opponent's score from week to week and divide by the total number of opponents, which in this case is 12. That average is then multiplied by the weighted value to obtain the first sub-part, which in this case is 0.666. For the second sub-part, each team receives a point value based on how many points their opponent scored for the week. Each team receives a new point value each week depending on how many points their opponent scored compared to all the other teams in the league. For example, in a 12 team league, the team whose opponent had the highest score for the week earns a value of 0.12. The team whose opponent had the second highest score for the week earns a value of 0.11. These values are awarded to each team down to a 0.01. The point value is then added from week to week to obtain a cumulative value, which is then multiplied by the weighted value, which in this case is 0.333, to obtain the second sub-part. The results of both sub-parts are added together which equal the total value for Strength of Schedule.

There are numerous possible formulas that could account for Strength of Schedule. The inventors intend to cover many different ways of assigning some meaningful weight to the Strength of Schedule so as to more accurately and fairly select the best teams for the playoffs.

S.O.S. Breakdown

TABLE 5c

Strength of Schedule Sub-parts Component of Another Example of an Improved Fantasy Football Ranking System

| | Average Points Term | First Sub-Part | Cumulative Value Term | Second Sub-Part | Total S.O.S. |
|---|---|---|---|---|---|
| the Dude Abides | 0.932 | 0.621 | 1.04 | 0.346 | 0.967 |
| Csonka's Hammer | 0.838 | 0.558 | 0.86 | 0.286 | 0.844 |

TABLE 5c-continued

Strength of Schedule Sub-parts Component of Another Example of an Improved Fantasy Football Ranking System

|  | Average Points Term | First Sub-Part | Cumulative Value Term | Second Sub-Part | Total S.O.S. |
|---|---|---|---|---|---|
| Whose Yer Daddy | 0.878 | 0.585 | 0.92 | 0.306 | 0.891 |
| Cobra Kai | 0.863 | 0.575 | 0.91 | 0.303 | 0.878 |
| Riggo's Hogs | 0.982 | 0.654 | 1.06 | 0.353 | 1.007 |
| CB's rebellion 2 | 0.796 | 0.530 | 0.65 | 0.216 | 0.747 |
| Da Browns | 0.934 | 0.622 | 1.08 | 0.360 | 0.982 |
| Bowers Boyz 2007 | 0.881 | 0.587 | 0.9 | 0.300 | 0.886 |
| North Coast Gamblers | 0.921 | 0.613 | 0.97 | 0.323 | 0.936 |
| Turd Fergueson | 0.897 | 0.597 | 0.98 | 0.326 | 0.924 |
| London Express | 0.957 | 0.637 | 1.07 | 0.356 | 0.994 |
| Bucknuts | 0.862 | 0.574 | 0.9 | 0.300 | 0.874 |

Each team is then ranked from 1 to 12 from the highest Strength of Schedule to the lowest as shown in Table 5d. In this example, the difference in Strength of Schedule amongst the teams is computed by subtracting a team's Strength of Schedule value from the team with the highest Strength of Schedule value—in this case, Riggo's Hogs. The leader is then assigned a rating of 1 and every other team a number less than one depending upon the difference in Strength of Schedule from their team and the leader. That rating is then multiplied by the weighted value of 0.333. The team with the highest weighted value achieves the highest rank for Strength of Schedule component.

S.O.S.

TABLE 5d

Strength of Schedule Component of Another Example of an Improved Fantasy Football Ranking System

| Owners | S.O.S | S.O.S Difference | S.O.S. Rating | Weighted Value | Rank |
|---|---|---|---|---|---|
| the Dude Abides | 0.967 | 0.04 | 0.96 | 0.320 | 4 |
| Csonka's Hammer | 0.844 | 0.163 | 0.837 | 0.279 | 11 |
| Whose Yer Daddy | 0.891 | 0.116 | 0.884 | 0.294 | 7 |
| Cobra Kai | 0.878 | 0.129 | 0.871 | 0.290 | 9 |
| Riggo's Hogs | 1.007 | 0 | 1 | 0.333 | 1 |
| CB's rebellion 2 | 0.747 | 0.26 | 0.74 | 0.246 | 12 |
| Da Browns | 0.982 | 0.025 | 0.975 | 0.325 | 3 |
| Bowers Boyz 2007 | 0.886 | 0.121 | 0.879 | 0.293 | 8 |
| North Coast Gamblers | 0.936 | 0.071 | 0.929 | 0.309 | 5 |
| Turd Fergueson | 0.924 | 0.083 | 0.917 | 0.305 | 6 |
| London Express | 0.994 | 0.013 | 0.987 | 0.329 | 2 |
| Bucknuts | 0.874 | 0.133 | 0.867 | 0.289 | 10 |

It is most interesting again to note that the team with the toughest Strength of Schedule, Riggo's Hogs, was ranked fifth in the conventional Fantasy Football scoring system. Further, the second ranked team with the toughest Strength of Schedule, London Express, was ranked 11th in the conventional Fantasy Football scoring system! And the team ranked #1 in the conventional Fantasy Football scoring system for Guillotine Cup league, the Dude Abides, only ranked fourth in the new Strength of Schedule rating. This alone, verifies the inventor's new concept to account for the Strength of Schedule in the formula to determine the playoff contenders.

So taking in consideration the three components cited above in Example 2, all the data was compiled by adding each component for each team. Table 6 below reveals the final results, the team with the best rating is #1 and the team with the worst is #12.

TABLE 6

New Fantasy Football Ranking System Results

| Rank | Team | Total Score |
|---|---|---|
| 1 | the Dude Abides | 0.986 |
| 2 | Whose Yer Daddy | 0.926 |
| 3 | Da Browns | 0.901 |
| 4 | Riggo's Hogs | 0.890 |
| 5 | Csonka's Hammer | 0.859 |
| 6 | Cobra Kai | 0.858 |
| 7 | Bowers Boyz 2007 | 0.776 |
| 8 | CB's rebellion 2 | 0.744 |
| 9 | North Coast Gamblers | 0.736 |
| 10 | London Express | 0.736 |
| 11 | Bucknuts | 0.709 |
| 12 | Turd Fergueson | 0.699 |

This example of the new and improved ranking system computes the three components somewhat differently and assigns different weights to each component then the formula in Example 1. However, the results are similar to the first example in that the same four teams are selected for the playoffs, two of which are different than the playoff teams selected in the conventional Fantasy Football ranking system. Table 7 compares the rankings of the conventional Fantasy Football system and an example of a new and improved ranking system disclosed in this invention. A few key observations from this new method show that Csonka's Hammer which made the playoffs in the Yahoo Fantasy Football system would not make the playoffs in a system which accounts for Strength of Schedule. Even though Csonka's Hammer was tied for first place in Win-Loss Record, they were eleventh in Strength of Schedule. So the new method disclosed in this invention clearly accounts for a team's Strength of Schedule and changes the rankings in a more fair and accurate manner.

TABLE 7

Conventional Fantasy Football Ranking vs. New Ranking System for Guillotine Cup League in Yahoo! Sports Fantasy Football

| Team | Fantasy Football Rank | New Rank |
|---|---|---|
| the Dude Abides | 1 | 1 |
| Whose Yer Daddy | 2 | 2 |
| Da Browns | 7 | 3 |
| Riggo's Hogs | 5 | 4 |
| Csonka's Hammer | 3 | 5 |
| Cobra Kai | 4 | 6 |
| Bowers Boyz 2007 | 8 | 7 |
| CB's rebellion 2 | 6 | 8 |
| North Coast Gamblers | 9 | 9 |
| London Express | 11 | 10 |
| Bucknuts | 10 | 11 |
| Turd Fergueson | 12 | 12 |

So once again, in the conventional Fantasy Football ranking system, the Dude Abides, Whose Yer Daddy, Csonka's Hammer, and Cobra Kai go to the playoffs. In the new and improved Fantasy Football ranking system, the Dude Abides, Whose Yer Daddy, Riggo's Hogs and Da Browns go the playoffs. It is critical to note that both Example 1 and Example 2 use different ways to calculate each component and different weights assigned to each component. Yet in both examples which account for the individual team's Strength of Schedule, one of two teams could win the championship that would not even be eligible for the playoffs under the standard Fantasy Football rating system.

Tables 8 and 9 show the importance of Strength of Schedule and the impact it could have on a team's Win-Loss Record. According to Yahoo! Sports ranking system, Riggo's Hogs finished 5th with an 8-6 Win-Loss Record and CB's rebellion finished 6$^{th}$ with an equivalent Win-Loss Record. However, Riggo's Hogs had the toughest Strength of Schedule while CB's rebellion had the easiest Strength of Schedule out of the twelve teams. This illustration will show how each team performed against their weekly opponent. It will also show the results if their schedules were switched and Riggo's Hogs had the easiest Strength of Schedule and CB's rebellion had the toughest Strength of Schedule. From Table 8, it is obvious the significant impact Strength of Schedule has on a team's Win-Loss Record. When going from the toughest Strength of Schedule to the easiest Strength of Schedule, Riggo's Hogs Win-Loss Record dramatically improves.

Table 8 demonstrates with actual data, the major flaw with all the current Fantasy Football ranking systems—that the ranking systems used do not take into consideration the most important component in determining the performance of a team—its Strength of Schedule. If this critical factor is not assigned some meaningful weight, then the only thing that can be assured in the current ranking system is that the best and most skillful teams will not always make it to the playoffs.

The easiest Strength of Schedule resulted in a Win-Loss Record of 8-6, however, by facing the toughest Strength of Schedule, CB's rebellion's Win-Loss Record substantially decreases. These two tables further justify the importance of Strength of Schedule and show why teams such as Riggo's Hogs deserve to be in the playoffs. Riggo's Hogs season should not be predetermined because of a random determination of their opponents.

Those skilled in the art will know that there are other factors that can be considered in determining the Fantasy Football rankings, and hence the selection of playoff contenders. For example, margin of victory could be a weighted factor in a formula to determine rankings. There are also numerous ways to determine the Total Points for a team based on different numerical values assigned to different performance criteria such as touchdowns, interceptions, fumble recoveries, yards rushing, yards passing, etc. Further, there are a number of different ways to calculate the team's Strength of Schedule. Finally different weights can be assigned to different components in computing the overall ranking of the teams in a Fantasy Football league. However, the authors disclose

TABLE 8

Riggo's Hogs schedule and result facing his opponents and CB's rebellion's opponents.

| Week | Riggo's Hogs Points | Vs. Riggo's Hogs Opponents Points | Vs. CB's rebellion Opponent Points |
|---|---|---|---|
| 1 | 72 | 99 - Bowers Boyz 2007 | 113 - Csonka's Hammer |
| 2 | 96 | 84 - CB's rebellion 2 | 96 - Riggo's Hog |
| 3 | 114 | 100 - the Dude Abides | 80 - Whose Yer Daddy |
| 4 | 77 | 92 - North Coast Gamblers | 51 - Turd Fergueson |
| 5 | 40 | 75 - Csonka's Hammer | 92 - Da Browns |
| 6 | 110 | 98 - London Express | 75 - Bucknuts |
| 7 | 84 | 151 - Whose Yer Daddy | 63 - Cobra Kai |
| 8 | 99 | 110 - Turd Fergueson | 74 - Bowers Boyz 2007 |
| 9 | 112 | 111 - Da Browns | 84 - London Express |
| 10 | 88 | 69 - Bucknuts | 62 - the Dude Abides |
| 11 | 91 | 78 - Cobra Kai | 65 - North Coast Gamblers |
| 12 | 100 | 98 - Bowers Boyz 2007 | 79 - Csonka's Hammer |
| 13 | 69 | 92 - CB's rebellion 2 | 69 - Riggo's Hogs |
| 14 | 122 | 119 - the Dude Abides | 112-Whose Yer Daddy |
| RESULTS | | 8 Wins 6 Losses | 10 Wins 2 Losses 2 Ties |

Table 9 shows CB's rebellion's match-ups week to week with the easiest Strength of Schedule and the result if his team faced the toughest Strength Schedule.

with this invention that whatever model or algorithm or computer program is used to determine the Fantasy Football rankings and thus playoff contenders, some meaningful weight or

TABLE 9

CB's rebellion's schedule and result facing his opponents and Riggo's Hogs opponents.

| Week | CB's rebellion Points | Vs. CB's rebellion Opponent Points | Vs. Riggo's Hogs Opponents Points |
|---|---|---|---|
| 1 | 70 | 113 - Csonka's Hammer | 99 - Bowers Boyz 2007 |
| 2 | 84 | 96 - Riggo's Hog | 84 - CB's rebellion 2 |
| 3 | 96 | 80 - Whose Yer Daddy | 100 - the Dude Abides |
| 4 | 68 | 51 - Turd Fergueson | 92 - North Coast Gamblers |
| 5 | 79 | 92 - Da Browns | 75 - Csonka's Hammer |
| 6 | 27 | 75 - Bucknuts | 98 - London Express |
| 7 | 77 | 63 - Cobra Kai | 151 - Whose Yer Daddy |
| 8 | 90 | 74 - Bowers Boyz 2007 | 110 - Turd Fergueson |
| 9 | 61 | 84 - London Express | 111 - Da Browns |
| 10 | 82 | 62 - the Dude Abides | 69 - Bucknuts |
| 11 | 79 | 65 - North Coast Gamblers | 78 - Cobra Kai |
| 12 | 104 | 79 - Csonka's Hammer | 98 - Bowers Boyz 2007 |
| 13 | 92 | 69 - Riggo's Hogs | 92 - CB's rebellion 2 |
| 14 | 85 | 112-Whose Yer Daddy | 119 - the Dude Abides |
| RESULTS | | 8 Wins 6 Losses | 4 Wins 8 Losses 2 Ties | account must be made of the individual team's Strength of Schedule, which is currently not done in any Fantasy Football web site. The embodiments provided herein have been determined by the inventors based on assessing the unfairness of these games, and provide ways of determining the strength of the schedule.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other ways of assessing schedule strength can be used. One other measure might be, for example, a ratio for a team of points scored against them and points scored by them.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A method of playing a simulated football game using a computer, comprising:

first using a computer to host a game in which a number of simulated football teams compete in a football tournament against one another, said football tournament having plural different games and simulating football teams playing against one another in a way that allows each of the teams to compete with one another and obtain scores based on said teams competing;

second using said computer to keep track of results including said scores in said games of said football tournament;

third using said results including said scores that are based on said teams competing to assess a strength of schedule representing difficulty of each of the games, where the difficulty of the games for each of the teams is individually assessed by assessing information about an opponent in each of the games based on total points scored by a team in plural games against plural opponents, and total points scored by a team's opponent in said plural games against plural opponents, said strength of schedule being assessed for at least a plurality of said simulated teams and at least a plurality of said games, and said strength of schedule based on all of 1) win/Loss record, 2) Total Points percentage for a specific week, calculated by determining a highest total points for the specific week and for each of the team, dividing points scored by the each team by the highest total points for the specific week, and 3) opponent Points percentage calculated by dividing the highest total points for the specific week by a number of points scored that week by the team's opponent for that week;

fourth using both said results for said games and said strength of schedule based on said games, to determine relative standings of the teams; and setting a schedule for additional games that are playoff games among said teams, based on said relative standings.

2. A method as in claim 1, wherein said fourth using comprises determining playoff contenders among said number of simulated teams.

3. A method as in claim 2, wherein said results used by said third using also includes at least a win-loss record of each said team.

4. A method as in claim 2, wherein said strength of schedule is assessed by determining a total number of points scored per game by a team, and using said total number of points to determine a relative ranking for the team, wherein each level of relative ranking gets a fixed ranking value that is used as part of said assess a strength of schedule.

5. A method as in claim 1, wherein said first using comprises operating the computer to play a fantasy football game.

6. A method, comprising:

first using a computer to host plural simulated football teams to compete in a fantasy football tournament, by controlling each of a plurality of users to connect remotely to said computer, controlling each of the plurality of users to become part of a simulated football team that is simulated, and to carry out at least one operation on the computer to play a simulated fantasy football game;

second using the computer to keep track of scores in each a plurality of fantasy football games where one of said football teams plays against another of said football teams, and to maintain win-loss information indicative of a win-loss record for each of said teams, where both said scores and said win-loss information are stored as first information;

third using said computer, to determine second information related to a difficulty of a game schedule being played by each of said teams, and said difficulty of schedule based on all of 1) win/Loss record, 2) Total Points percentage for a specific week, calculated by determining a highest total points for the specific week and for each of the team, dividing points scored by the each team by the highest total points for the specific week, and 3) opponent Points percentage calculated by dividing the highest total points for the specific week by a number of points scored that week by the team's opponent for that week; and based on both said first information and said second information, determining finalists in a tournament and allowing said finalists to play an additional game that is not played by non-finalists, wherein said difficulty of said game schedule is assessed by determining a total points scored by a team in plural games against plural opponents, and total points scored by a team's opponent in said plural games against plural opponents.

7. A method as in claim 6, wherein said second using also comprises storing points information indicative of numbers of points scored by teams, and said third using comprises using said points information in addition to said first information and said second information to determine said finalists.

8. A method as in claim 6, wherein said second using also comprises storing information indicative of total numbers of points, and using said total numbers of points in addition to first information and said second information.

9. A method as in claim 6, wherein said difficulty of said game schedule is assessed by determining a total number of points scored per game, and using said total number of points to determine a relative ranking for the team, wherein each level of relative ranking gets a fixed ranking value that is used as part of said difficulty of game schedule.

10. A method as in claim 6, wherein said plural simulated football games which are hosted by said computer or fantasy football games.

11. A method, comprising:
hosting a website that allows playing a simulated football game using a computer, in which a number of simulated football teams compete in a football tournament against one another, said football tournament having plural different games by said simulating football teams against one another in a way that allows each of the teams to compete with one another and obtain scores based on said teams competing;
storing information indicative of results including said scores in said games of said football tournament;
determining a strength of schedule representing difficulty of each of the games, based on actions during said football tournament, where the difficulty of the games for each of the teams is individually assessed by assessing said information about an opponent in each of the games including assessing said scores in said games of said football tournament, said strength of schedule being assessed for at least a plurality of said simulated teams and at least a plurality of said games, said strength of schedule based on all of 1) win/Loss record, 2) Total Points percentage for a specific week, calculated by determining a highest total points for the specific week and for each of the team, dividing points scored by the each team by the highest total points for the specific week, and 3) opponent Points percentage calculated by dividing the highest total points for the specific week by a number of points scored that week by the team's opponent for that week; and
determining relative standings of the teams using both said results for said games and said strength of schedule based on said games, and taking at least one additional action based on said relative standings, wherein said results stored by said storing includes a total number of points scored by each said team against opponents, and said total number of points is used for said determining said strength of schedule.

12. A method as in claim 11, wherein said determining relative standings also includes using at least a win-loss record of each said team.

13. A method as in claim 12, wherein said results stored by said storing includes a total number of points scored by each said opponent team of the team whose strength of schedule is being determined.

14. A method as in claim 11, wherein said strength of schedule is assessed by determining a total number of points scored per game, and using said total number of points to determine a relative ranking for the team, wherein each level of relative ranking gets a fixed ranking value that is used as part of said determining strength of schedule.

15. A method as in claim 11, wherein said website that is hosted plays a fantasy football game.

16. A method, comprising:
playing a simulated football game using a computer, in which a number of simulated football teams compete in a football tournament against one another, said football tournament having plural different games by said simulating football teams against one another in a way that allows each of the teams to compete with one another and obtain scores based on said teams competing;
viewing results including said scores in said games of said football tournament;
viewing relative standings of the teams using both said results for said games and a strength of schedule based on said games, where said strength of schedule represents difficulty of each of the games, based on actions during said football tournament, where the difficulty of the games for each of the teams is individually based on information about an opponent in each of the games, said strength of schedule being individual for at least a plurality of said simulated teams and at least a plurality of said games, said strength of schedule based on all of 1) win/Loss record, 2) Total Points percentage for a specific week, calculated by determining a highest total points for the specific week and for each of the team, dividing points scored by the each team by the highest total points for the specific week, and 3) opponent Points percentage calculated by dividing the highest total points for the specific week by the number of points scored that week by the team's opponent for that week; and
viewing a number of finalists in the tournament that are based on said relative standings, wherein said strength of schedule is assessed by determining a total number of points scored by each team, and a total number of points scored by an opponent team.

17. A method as in claim 16, wherein said simulated football game is a fantasy football game.

* * * * *